(12) United States Patent
Gibson et al.

(10) Patent No.: US 6,743,454 B1
(45) Date of Patent: Jun. 1, 2004

(54) METHOD AND APPARATUS FOR PREPARING BONED PORK PRODUCTS

(75) Inventors: Robert D. Gibson, Union, CT (US); Warren D. Kenniston, Holland, MA (US); Christopher Overbaugh, Duluth, GA (US)

(73) Assignee: Gemini Food Industries, Inc.

( * ) Notice: Subject to any disclaimer, the term of this patent is extended or adjusted under 35 U.S.C. 154(b) by 0 days.

(21) Appl. No.: 09/454,761

(22) Filed: Dec. 6, 1999

(51) Int. Cl.[7] ............................................. A23B 4/01
(52) U.S. Cl. ....................... 426/243; 426/645; 426/466; 426/510; 426/511; 426/523; 426/524
(58) Field of Search .......................... 99/339, 355, 357, 99/386, 388, 404, 407, 443 C, 470; 426/510–511, 523, 524, 241, 243, 641, 645, 466

(56) References Cited

U.S. PATENT DOCUMENTS

| | | | | |
|---|---|---|---|---|
| 3,736,860 A | * | 6/1973 | Vischer et al. | 99/339 |
| 4,196,219 A | * | 4/1980 | Shaw et al. | 426/89 |
| 4,565,704 A | * | 1/1986 | Dagerskog et al. | 426/233 |
| 4,867,994 A | * | 9/1989 | Perrine | 426/232 |
| 5,189,948 A | * | 3/1993 | Liebermann et al. | 99/443 C |
| 5,314,705 A | * | 5/1994 | Hansson et al. | 426/574 |
| 5,741,536 A | * | 4/1998 | Mauer et al. | 426/520 |
| 5,942,142 A | * | 8/1999 | Forney et al. | 219/388 |
| 6,132,783 A | * | 10/2000 | Rajapakse | 426/243 |

OTHER PUBLICATIONS

Stein Equipment Company brochure model name: Stein–Checker Steamer, four pages.
Pyramid Food Processing information sheet for model name: 40–15 radiant wall oven.

* cited by examiner

*Primary Examiner*—Drew Becker
(74) *Attorney, Agent, or Firm*—Kriegsman & Kriegsman

(57) ABSTRACT

An apparatus for preparing a boned pork product includes a searing oven at a high temperature cooking station for braising and charring the boned pork product using radiant heat. The apparatus also includes a dual box, spiral steam cooker at a low temperature cooking station for cooking the boned pork product using steam to yield a fully-cooked, boned pork product. The apparatus further includes a freezer at a freezer station for freezing the fully-cooked, boned pork product. A first conveyor belt is disposed between the searing oven and the steam cooker and serves to mechanically transport the boned pork product from the high temperature cooking station to the low temperature cooking station. A second conveyor belt is disposed between the steam cooker and the freezer and serves to mechanically transport the fully-cooked, boned pork product from said low temperature cooking station to said freezer station.

15 Claims, 1 Drawing Sheet

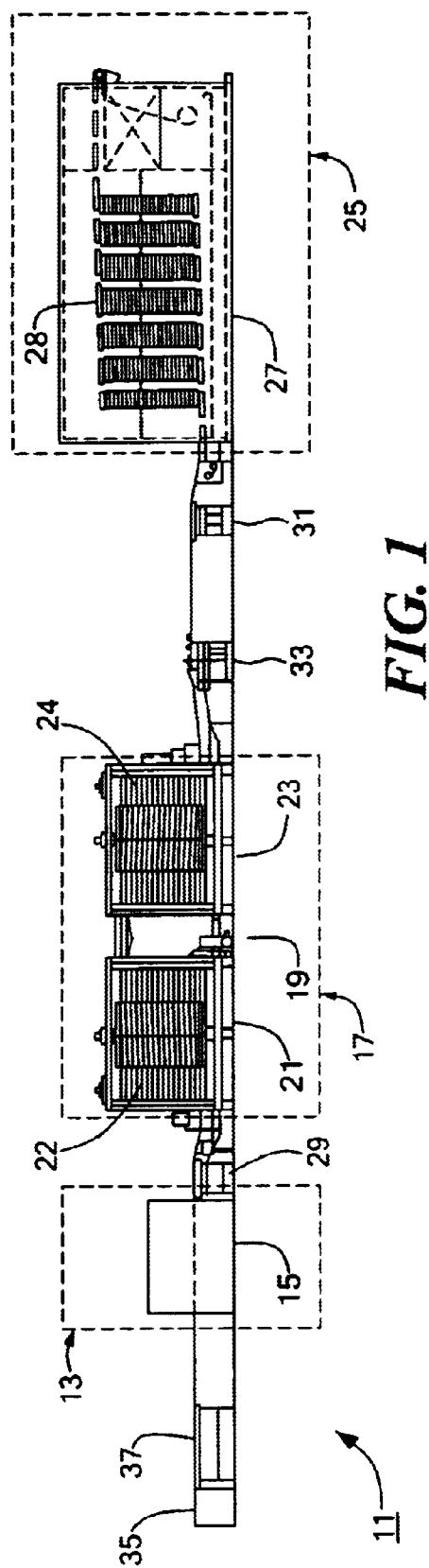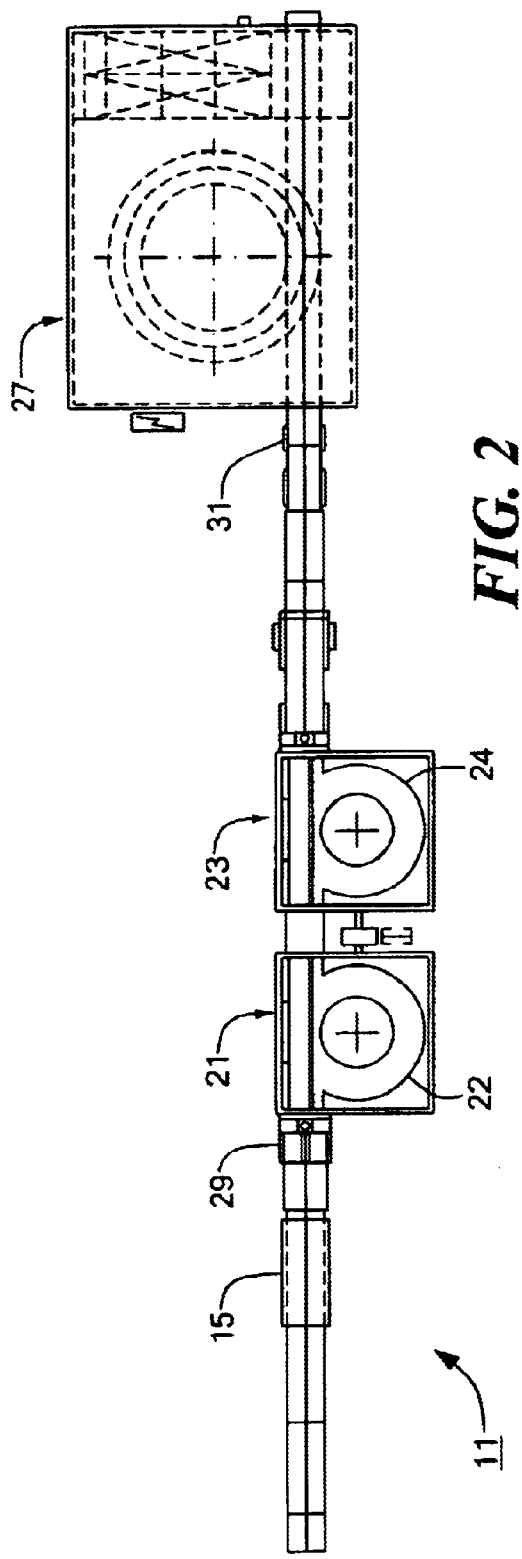

METHOD AND APPARATUS FOR PREPARING BONED PORK PRODUCTS

BACKGROUND OF THE INVENTION

The present invention relates generally to a method and apparatus for cooking food and more particularly to a method and apparatus for preparing boned pork products, wherein boned pork products refers to pork products having a bone therein, such as pork ribs and pork chops.

Boned pork products are often made by slow-cooking using low temperature heat to yield a fully cooked and tender product. As an example, boned pork products are often slow-cooked on a grill using a low flame. As another example, boned pork products are often slow-cooked in a smokehouse.

A smokehouse is a relatively small enclosed room having an interior climate which is exposed to a low temperature heat. To cook a boned pork product in a smokehouse, a laborer transports an uncooked, boned pork product into the smokehouse and typically hangs the product on a hook or lays the product on a rack. The product is then left in the room and the relatively low heat of the air within the smokehouse serves to slowly cook the product. The product is left in the smokehouse for a prolonged period of time, such as approximately five hours, until the product is fully cooked.

It should be noted that humidity is often introduced into the interior of the smokehouse to add moisture to the product. Furthermore, it should also be noted that smoke is often introduced into the interior of the smokehouse to add flavor to the product. Specifically, two types of smoke are often provided into the room in order to be absorbed into the product for flavoring, a natural smoke created by burning natural woods, such as hickory, maple or apple woods, or an artificial liquid smoke which is less expensive than natural smoke.

After the low temperature climate inside the smokehouse serves to fully cook the boned pork product, a laborer enters the smokehouse, removes the boned pork product from the rack or hook on which it is disposed and transports the cooked product to a final cooking station, such as a kitchen or grilling area. Preferably, the product is then seasoned, such as by coating the product with a marinate or a sauce, and grilled over an open flame to give the product a charred exterior, thereby providing the product with a grilled flavor and appearance, which is highly desirable.

As can be appreciated, cooking boned pork products over a low-flamed grill or in a smokehouse provides desirable advantages. For example, the slow-cooking technique achieved by a low temperature smokehouse or low-flamed grill serves to thoroughly cook the boned pork product with a high level of tenderness and taste, thereby yielding a top quality cooked product.

However, it has also been found that cooking boned pork products over a low-flamed grill or in a smokehouse introduces numerous disadvantages.

As a first disadvantage, it has been found that cooking boned pork products over a low-flamed grill or in a smokehouse significantly limits the volume of boned pork products that can be cooked during a particular period of time. Specifically, an open grill and a smokehouse is of a relatively small size and accordingly, has a limited capacity to cook boned pork products. As such, because an open grill and a smokehouse both require a long period of time to fully cook the product, only a relatively small volume of product can be cooked per day.

As a second disadvantage, it has been found that cooking boned pork products over a low-flamed grill or in a smokehouse requires a lengthy stop in production each time a laborer replaces the cooked product with an uncooked product, thereby creating a noncontinuous flow of product. This significantly limits the overall volume and productivity of such a system.

As a third disadvantage, it has been found that cooking boned pork products over a low-flamed grill or in a smokehouse is very labor intensive, thereby rendering such a system more time consuming and costly.

As a fourth disadvantage, it has been found that cooking boned pork products over a low-flamed grill or in a smokehouse requires a relatively large amount of labor interaction, thereby exposing the boned pork product to potential contaminants, such as bacteria, which could compromise the sanitariness of the product.

As a fifth disadvantage, it has been found that cooking boned pork products over a low-flamed grill or in a smokehouse requires a relatively large amount of labor interaction, thereby compromising the consistency of the product. Specifically, the high level of labor interaction can often cause the product to be undercooked or overcooked.

SUMMARY OF THE INVENTION

It is an object of the present invention to provide a new and improved method and apparatus for preparing boned pork products.

It is another object of the present invention to provide a method and apparatus for preparing boned pork products as described above which cooks the product with a high level of tenderness and taste and with an appetizing appearance.

It is yet another object of the present invention to provide a method and apparatus for preparing boned pork products as described above which prepares a relatively large volume of product.

It is still another object of the present invention to provide a method and apparatus for preparing boned pork products as described above which is continuous in production.

It is another object of the present invention to provide a method and apparatus for preparing boned pork products as described above which is not labor intensive.

It is yet another object of the present invention to provide a method and apparatus for preparing boned pork products as described above which has a limited number of parts, which is easy to use and which is inexpensive to manufacture.

Accordingly, as one feature of the present invention, there is provided an apparatus for preparing a boned pork product, said apparatus comprising a high temperature cooking station for braising and charring the boned pork product using radiant heat, a low temperature cooking station for cooking the boned pork product using steam to yield a fully-cooked, boned pork product, and a freezer station for freezing the fully-cooked, boned pork product.

As another feature of the present invention, there is provided a method for preparing a boned pork product comprising the steps of applying radiant heat to the boned pork product at a high temperature cooking station, applying steam to the boned pork product at a low temperature cooking station to yield a fully-cooked, boned pork product, and freezing the fully-cooked, boned pork product at a freezing station.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken a limiting sense, and the scope of the present invention is best defined by the appended claims.

BRIEF DESCRIPTION OF THE DRAWINGS

In the drawings wherein like reference numerals represent like parts:

FIG. 1 is a side view of an apparatus for preparing boned pork products constructed according to the teachings of the present invention; and FIG. 2 is a top view of the apparatus shown in FIG. 1.

DETAILED DESCRIPTION OF THE PREFERRED EMBODIMENT

Referring now to FIGS. 1–2, there is shown an apparatus for preparing a boned pork product constructed in accordance with the principles of the present invention, the apparatus being identified by reference numeral 11. It should be noted that although apparatus 11 is designed to be used to prepare boned pork products, it is to be understood that apparatus 11 is not limited to being used to prepare boned pork products. Rather, apparatus 11 could be used to prepare alternative types of food products, such boned beef products, without departing from the spirit of the present invention.

Apparatus 11 comprises a high temperature cooking station 13 for braising and charring the boned pork product using radiant infrared heat. Specifically, high temperature cooking station 13 comprises a radiant heat searing oven 15 which cooks the product at a relatively high temperature (approximately 1500° F.) for a relatively short period of time (approximately 1.5 to 1.75 minutes). Radiant heat searing oven 15 is preferably a model 40–15 radiant wall oven of the type manufactured by Pyramid Food Processing.

As can be appreciated, searing oven 15 serves two principal functions. First, radiant heat searing oven 15 serves to braise the product, thereby rendering out the fat from the product. Second, the high temperature radiant heat produced by searing oven 15 also serves to sear, or char, the exterior of the product, thereby providing the exterior of the boned pork product with a darkened color and a charred appearance.

Apparatus 11 also comprises a low temperature cooking station 17 for fully cooking and tenderizing the boned pork product using steam or moist heat to yield a fully-cooked product. Specifically, low temperature cooking station 17 comprises a steam cooker 19 which cooks the product at a relatively low temperature (preferred range of approximately 180°–200° F.; maximum temperature of 212° F.) for a relatively long period of time (approximately two hours). Steam cooker 19 is preferably a SCS-865-SRD model steam cooker of the type manufactured by Stein Equipment Company of Sandusky, Ohio. Steam cooker 19 comprises an upward spiral steam cooker box 21, which includes a continuously-driven, upward spiral configured, metal belt 22, and a downward spiral steam cooker box 23, which includes a continuously-driven, downward spiral configured, metal belt 24. During the cooking process, the product is mechanically advanced in a continuous, upward spiral by metal belt 22 and directly onto metal belt 24 which then mechanically advances the product in a continuous, downward spiral.

As can be appreciated, using steam cooker 19 to cook the boned pork product provides numerous advantages. First, using steam cooker 19 to cook the boned pork product quickly and efficiently cooks the entire product without browning. Second, using steam cooker 19 to cook the boned product is relatively inexpensive in comparison to other traditional cooking methods, such as oven roasting. Third, using a high humidity steam cooker 19 to cook the boned pork product adds moisture and tenderness to the product.

It is to be understood that steam cooker 19 is not limited to the use of spiral steam cooker boxes 21 and 23. Rather, steam cooker 19 could include alternative numbers and types of steam cookers without departing from the spirit of the present invention.

Apparatus further comprises a freezing station 25 for freezing the fully-cooked, boned pork product. Specifically, freezing station 25 comprises a freezer 27 which either refrigerates, partially freezes or fully freezes the product for distribution purposes. Freezer 27 is preferably a GCM-92 model upward spiral freezer of the type manufactured by Stein Equipment Company of Sandusky, Ohio. Freezer 27 includes a continuously-driven, upward spiral configured, metal belt 28. However, it is to be understood that freezer 27 could be replaced with alternative types of conventional freezers without departing from the spirit of the present invention.

As can be appreciated, freezer 27 serves to refrigerate, partially freeze or fully freeze the fully-cooked product prior to packaging. Cooling the fully-cooked product retards the growth of bacteria on the product during the distribution process of the product to the place of sale, such as a supermarket or restaurant.

A continuous, metal mesh conveyor belt 29 is disposed through radiant heat searing oven 15 and terminates into steam cooker box 21, as shown in FIG. 1. Conveyor belt 29 is rotatably driven to transport the boned pork product into radiant heat searing oven 15, through radiant heat searing oven 15 and into steam cooker box 21.

Similarly, a continuous, metal mesh conveyor belt 31 is disposed between cooking station 17 and freezing station 25, as shown in FIG. 1. Conveyor belt 31 is rotatably driven to transport the fully cooked product from steam cooker box 23, through a battering device 33 and into freezer 27.

As can be appreciated, conveyor belts 29 and 31 serve two principal functions. First, belts 29 and 31 allow for a continuous flow of product to pass through apparatus 11 thereby increasing the overall volume of production. Second, belts 29 and 31 allow for product to pass through apparatus 11 without the need of human interaction, thereby improving the purity, consistency, and cost of the finished product.

Batter applicator 33 is disposed along conveyor belt 31 between cooking station 17 and freezer 27 and serves to immerse the cooked product in bacon grease or other glaze solution for flavoring. Batter applicator 33 is preferably is preferably an APB-40 model batter applicator of the type manufactured by Stein Equipment Company of Sandusky, Ohio. It should be noted that the APB-40 model batter applicator includes a 40 gallon kettle, a 4 inch tri-clover pump and controls. However, it should also be noted that batter applicator 33 is not a critical component of apparatus 11 and accordingly, could be removed from apparatus 11 or replaced by an alternative battering device without departing from the spirit of the present invention.

A marination device 35 is disposed before cooking station 13, as shown in FIG. 1, and serves to season, marinate and/or hydrate the boned pork product before the cooking process. Marination device 35 is preferably an enclosed unit which includes a tumble, or mixing, mechanism which adequately marinates, seasons and/or hydrates the product. As can be appreciated, by adding water to the product before cooking, marination device 35 ensures that the product does not become too dry during the cooking process. Specifically, due to the presence of salts and phosphates therein, the product is able to absorb water through marination. This is significant because the cooking process can remove significant amounts of water from the product.

A layout table 37 is disposed between marination device 35 and cooking station 13. Layout table 37 serves to hold the product after marination and until conveyor belt 29 advances the product into searing oven 15. It should be noted that marination device 35 and layout table 37 are not a critical components of apparatus 11 and accordingly, could be removed without departing from the spirit of the present invention.

In use, apparatus 11 can be used to prepare a boned pork product for distribution in the following manner. An uncooked, boned pork product is disposed into marination device 35. Activation of marination device 35 seasons, marinates and/or hydrates the product. After marination, the product is placed on layout table 37 until such time when the product is disposed onto conveyor belt 29.

Activation of conveyor belt 29 mechanically advances the product into searing oven 15 which, in turn, serves to braise and char the product using radiant heat. Continued rotation of conveyor belt 29 mechanically advances the seared and charred product onto metal belt 22 of cooker box 21. Metal belt 22 mechanically advances the product in an upward spiral direction, with cooker box 21 cooking the product using steam. Continued rotation of metal belt 22 mechanically advances the product onto metal belt 24 of cooker box 23. Metal belt 24 mechanically advances the product in a downward spiral direction, with cooker box 23 cooking the product using steam to yield a fully-cooked product.

Continued rotation of metal belt 24 mechanically advances the fully-cooked product onto conveyor belt 31. Activation of conveyor belt 31 mechanically advances the fully-cooked product through battering device 33 where the product is immersed in a glaze solution for flavoring. Continued rotation of conveyor belt 31 mechanically advances the fully-cooked product onto metal belt 28 of freezer 27.

Activation of metal belt 28 of freezer 27 mechanically advances the product in an upward spiral direction, with freezer 27 cooling the product to yield a fully-prepared product. Continued rotation of metal belt 28 advances the fully-prepared product out of freezer 27, where the product can be packaged in boxes for distribution.

After distribution, the fully-prepared product can be removed from the packing and warmed by the temperature of the room for approximately ten minutes to thaw the product. The product can then be warmed up for a couple minutes, such as by grilling, baking or microwaving, and served for consumption.

The embodiment shown of the present invention is intended to be merely exemplary and those skilled in the art shall be able to make numerous variations and modifications to it without departing from the spirit of the present invention. For example, apparatus 11 could be constructed to include a single conveyor belt for mechanically advancing the product throughout the entire apparatus. All such variations and modifications are intended to be within the scope of the present invention as defined in the appended claims.

What is claimed is:

1. A method for preparing a fully-cooked boned pork product comprising the steps of:
   (a) applying radiant infrared heat to the boned pork product at a temperature of about 1500° F. for about 1.5 to 1.75 minutes at a first station whereby the boned pork product is braised and charred, then
   (b) applying steam to the braised and charred boned pork product at a temperature of about 180° F.–212° F. for about 2 hours using at least one spiral steam cooker at a second station whereby the braised and charred boned pork product is fully-cooked, and then
   (c) cooling the fully-cooked boned pork product at a third station.

2. The method of claim 1 further comprising the step of transporting the product from the first station to the second station.

3. The method of claim 2 further comprising the step of transporting the product from the second station to the third station.

4. The method of claim 1 wherein said step of applying radiant infrared heat to the boned pork product is accomplished using a radiant heat searing oven.

5. The method of claim 2 wherein said step of transporting the product from the first station to the second station is accomplished using a first conveyor belt.

6. The method of claim 3 wherein said step of transporting the product from the second station to the third station is accomplished using a second conveyor belt.

7. The method as claimed in claim 1 wherein said steam applying step is performed using two spiral steam cookers.

8. A method for preparing a fully-cooked and frozen boned pork product comprising the steps of:
   (a) heating the boned pork product with radiant infrared heat at a temperature of about 1500° F. for about 1.5 to 1.75 minutes whereby the boned pork product is braised and charred, then
   (b) steaming the braised and charred boned pork product at a temperature of about 180° F.–212° F. for about 2 hours using at least one spiral steam cooker whereby the braised and charred boned pork product is fully-cooked, and then
   (c) freezing the fully-cooked boned pork product.

9. The method of claim 8 further comprising the step of marinating the boned pork product prior to heating the boned pork product with radiant infrared heat.

10. The method of claim 9 further comprising the step of immersing the boned pork product in bacon grease or other glaze solution for flavoring after the boned pork product is fully cooked and before it is frozen.

11. A method for preparing a fully-cooked boned pork product, said method comprising the steps of:
   (a) depositing an uncooked boned pork product on a first conveyor belt, said first conveyor belt conducting the uncooked boned pork product through a radiant infrared heat searing oven for about 1.5 to 1.75 minutes at a temperature of about 1500° F., whereby the boned pork product is braised and charred;

(b) then, transferring the braised and charred boned pork product onto a second conveyor belt, said second conveyor belt conducting the braised and charred boned pork product through a first spiral steam cooker for about 1 hour at a temperature of about 180° F.–212° F.; and (c) then, transferring the braised and charred boned pork product onto a third conveyor belt, said third conveyor belt conducting the braised and charred boned pork product through a second spiral steam cooker for about 1 hour at a temperature of about 180° F.–212° F., whereby the braised and charred boned pork product is fully-cooked.

12. The method as claimed in claim 11 wherein said first spiral steam cooker is an upward spiral steam cooker and said second spiral steam cooker is a downward spiral steam cooker.

13. The method as claimed in claim 11 further comprising, after step (c), the step of transferring the fully-cooked boned pork product onto a fourth conveyor belt, said fourth conveyor belt conducting the fully-cooked boned pork product from said second spiral steam cooker into a freezer.

14. The method as claimed in claim 11 wherein all of said transferring steps are automated.

15. The method as claimed in claim 11 further comprising, prior to step (a), the step of marinating the uncooked boned pork product.

* * * * *